(12) United States Patent
Lichtenbelt et al.

(10) Patent No.: US 8,253,749 B1
(45) Date of Patent: Aug. 28, 2012

(54) USING AFFINITY MASKS TO CONTROL MULTI-GPU PROCESSING

(75) Inventors: Barthold B. Lichtenbelt, Fort Collins, CO (US); Jeffrey F. Juliano, Cary, NC (US); Jeffrey A. Bolz, Santa Clara, CA (US); Ross A. Cunniff, Fort Collins, CO (US)

(73) Assignee: NVIDIA Corporation, Santa Clara, CA (US)

( * ) Notice: Subject to any disclaimer, the term of this patent is extended or adjusted under 35 U.S.C. 154(b) by 905 days.

(21) Appl. No.: 11/683,185

(22) Filed: Mar. 7, 2007

Related U.S. Application Data

(60) Provisional application No. 60/780,901, filed on Mar. 8, 2006.

(51) Int. Cl.
*G06F 15/16* (2006.01)
*G06F 9/46* (2006.01)

(52) U.S. Cl. ........................... 345/502; 718/102
(58) Field of Classification Search .................. 345/502; 718/102
See application file for complete search history.

(56) References Cited

U.S. PATENT DOCUMENTS

| | | | |
|---|---|---|---|
| 6,243,107 B1 * | 6/2001 | Valtin et al. ........................ 345/506 |
| 6,529,198 B1 * | 3/2003 | Miyauchi ............................ 345/505 |
| 6,658,448 B1 * | 12/2003 | Stefaniak et al. ................... 718/104 |
| 6,727,904 B2 * | 4/2004 | Walls et al. ........................ 345/506 |
| 6,782,410 B1 * | 8/2004 | Bhagat et al. ....................... 709/201 |
| 6,853,380 B2 * | 2/2005 | Alcorn ................................ 345/506 |
| 7,275,249 B1 * | 9/2007 | Miller et al. ........................ 718/105 |
| 7,389,506 B1 * | 6/2008 | Miller et al. ............................ 718/1 |
| 7,389,508 B2 * | 6/2008 | Aguilar et al. ..................... 718/104 |
| 7,451,459 B2 * | 11/2008 | Glass et al. ....................... 719/328 |
| 2003/0088608 A1 * | 5/2003 | McDonald ......................... 709/106 |
| 2004/0068730 A1 * | 4/2004 | Miller et al. ....................... 718/106 |
| 2004/0226026 A1 * | 11/2004 | Glass et al. ....................... 719/328 |
| 2005/0108717 A1 * | 5/2005 | Hong et al. ........................ 718/102 |
| 2005/0134588 A1 * | 6/2005 | Aila et al. .......................... 345/426 |
| 2005/0246461 A1 * | 11/2005 | Accapadi et al. .................. 710/200 |

OTHER PUBLICATIONS

Barthold Lichtenbelt, NVIDIA presentation: "GPU Affinity", Oct. 2005.
Andy Ritger et al., NVIDIA Open GL Extension, WGL_NV_gpu_affinity, Version: Last Modified Oct. 28, 2005, http://developer.nvidia_opengl_specs.html.
Paul Ramsey, "GLP An OpenGL Extension for Graphics Without a Window System", pp. 1-51. Presentation by SUN Microsystems to the OpenGL ARB standardization body on Sep. 23, 2004.
Paul Ramsey, "The GLP OpenGL Extension, OpenGL Rendering Without a Window System"... Presentation by SUN Microsystems to the OpenGL ARB standardization body on Sep. 23, 2004.

\* cited by examiner

*Primary Examiner* — Daniel Washburn
(74) *Attorney, Agent, or Firm* — Patterson & Sheridan, LLP

(57) ABSTRACT

One embodiment of the present invention sets forth a set of application programming interface (API) extensions that enable a software application to control the processing work assigned to each GPU in a multi-GPU system. The software application enumerates a list of available GPUs, sets an affinity mask from the enumerated list of GPUs and generates an affinity device context associated with the affinity mask. The software application can then generate and utilize an affinity rendering context that directs rendering commands to a set of explicitly selected GPUs, thus allocating work among specifically selected GPUs. The software application is empowered to use domain specific knowledge to better optimize the work assigned to each GPU, thus achieving greater overall processing efficiency relative to the prior art techniques.

22 Claims, 4 Drawing Sheets

USING AFFINITY MASKS TO CONTROL MULTI-GPU PROCESSING

CROSS-REFERENCE TO RELATED APPLICATIONS

The present application claims the priority benefit of U.S. Provisional Patent Application Ser. No. 60/780,901, titled "USING AFFINITY MASKS TO CONTROL MULTI-GPU PROCESSING," filed on Mar. 8, 2006.

BACKGROUND OF THE INVENTION

1. Field of the Invention

Embodiments of the present invention generally relate to graphics processing and more specifically to using affinity masks to control multi-GPU graphics processing.

2. Description of the Related Art

Computer graphics image data typically undergoes several processing steps before each graphics frame is completely rendered for display or storage. Each processing step typically operates on graphics image data utilizing programming steps defined through an application programming interface (API), enabling the graphics application to utilize high performance hardware, such as a graphics processing unit (GPU), to execute a set of processing steps with minimal real-time supervision from a host CPU. For example, a software application executing on a host central processing unit (CPU) may use an API to program processing steps in a GPU that may perform physics, graphics rendering and other related computations. The API is typically implemented within a software driver. The software driver processes the commands received from the application and uses the result of that processing to control the GPU in a system.

Historically, computing devices have included only one GPU that was responsible for both processing graphics commands and displaying the resulting images. With only one GPU, questions about how to distribute work among multiple processing devices never really arose. By default, all such decisions have traditionally been left up to the software driver, and conventional APIs, adhering to this architectural model, provide little opportunity to the software application to assign processing work. Such an approach, however, is problematic in systems with more than one GPU, known as "multi-GPU" systems, because the software driver distributes work among the various GPUs without any domain specific knowledge, which oftentimes results in inefficient work distribution among the GPUs.

As the foregoing illustrates, what is needed in the art is a mechanism for enabling applications to have greater control over which GPUs in a multi-GPU system process specific sets of commands.

SUMMARY OF THE INVENTION

One embodiment of the present invention sets forth a method for controlling the allocation of processing work in a system having a plurality of graphics processing units available for processing. The method includes the steps of receiving an affinity mask reflecting which graphics processing units in the plurality of graphics processing units have been selected to process work associated with a current rendering context, generating an affinity device context based on the affinity mask and including each graphics processing unit that has been selected to process work associated with the current rendering context, and generating an affinity rendering context from the affinity device context, where the affinity rendering context inherits the affinity mask from the affinity device context.

One advantage of the disclosed method is that it allows a software application to utilize domain specific knowledge to select which GPUs in a multi-GPU system are assigned specific rendering work. In this way, graphics processing work may be allocated to the GPUs more efficiently relative to the work allocations that software drivers typically achieve in prior art multi-GPU systems. Another advantage is that existing API models may be preserved since they operate orthogonally to the GPU selection process described herein, making the disclosed method cost effective.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
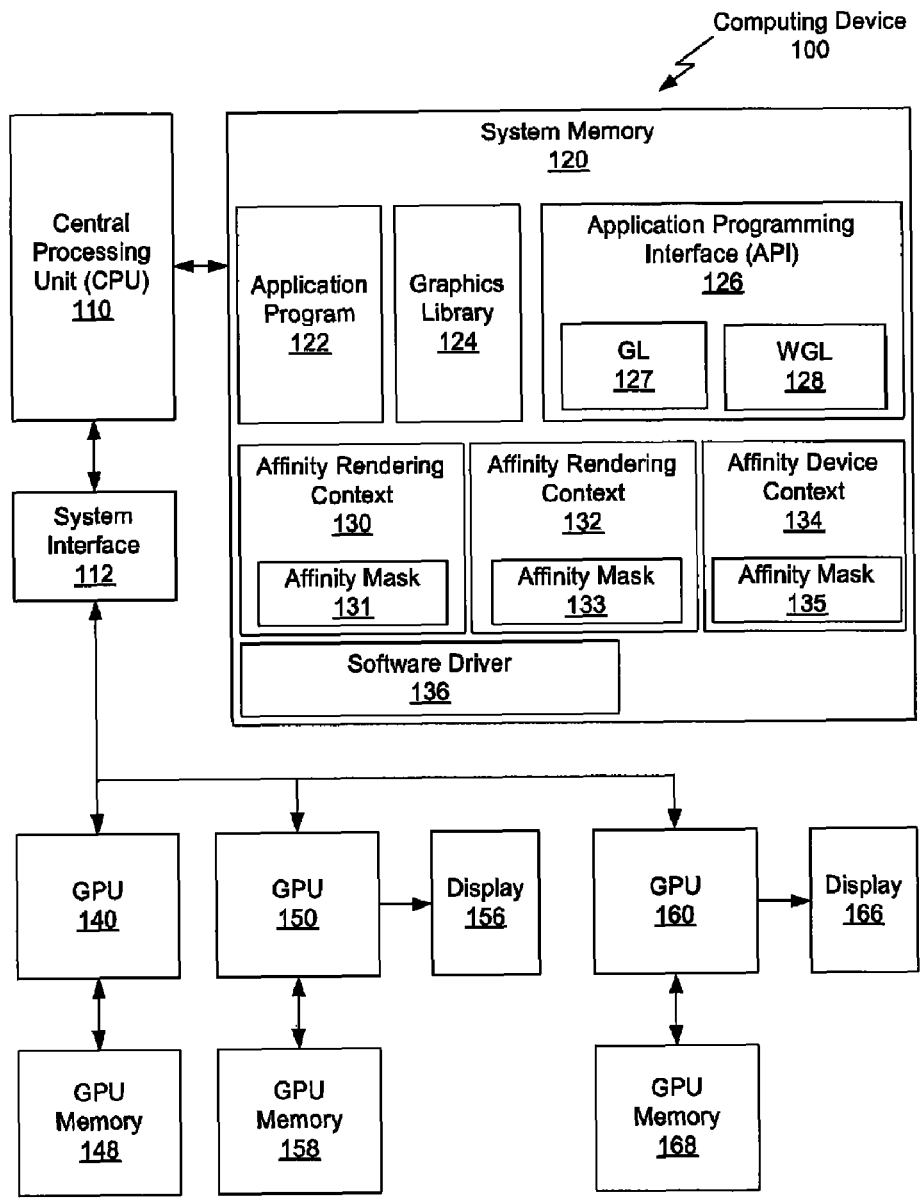
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a CPU 110 that is connected to a system interface 112 and a system memory 120. The system interface 112 connects the CPU 110 to multiple GPUs 140, 150, 160. A GPU memory 148 is connected to GPU 140. A GPU memory 158 is connected to GPU 150. Additionally, a display 156 is connected to GPU 150. A GPU memory 168 is connected to GPU 160. Additionally, a display 166 is connected to GPU 160. Each of the GPU memories 148, 158, 168 is also referred to as "local memory" or "frame buffer memory." Each display 156, 166 may be a cathode ray tube (CRT), liquid crystal display (LCD), plasma display or any other appropriate display device.

An application program 122 is loaded into system memory 120 for execution by the CPU 110. A graphics library 124, such as the OpenGL Utility Toolkit (GLUT), implements certain high-level, system-independent, and well-known graphics related functions. An API 126 may include support for a graphics language (GL) API 127, such as OpenGL™ or D3D™. The GL API 127 implements common lower-level features and maps these features to access functions that control the GPUs 140, 150, 160. The API 126 may also include interface functions for managing OpenGL™ within the context of a specific operating system. For example, the WGL API 128 is a well-known set of API calls that specifies an interface for managing OpenGL™ within the Microsoft Windows™ operating system. The graphics library 124 calls the API 126 to access specific processing features in the GPUs 140, 150, 160. The application program 122 may use a combination of features in the graphics library 124 and the API 126 to invoke certain graphics functions for generating the graphics images requested to be rendered by the application program 122.

As shown, a given application program 122 may use more than one rendering context, for example, to execute more than one type of GPU processing. The present invention enables rendering commands related to a particular rendering context to be directed to a specific set of GPUs selected by the application program 122 for processing. More specifically, and as described in greater detail in FIG. 2, the application program 122 is able to access various extensions from API 126 that allow the application program 122 to create an affinity device context that includes only the specified set from the available GPUs 140, 150 and 160 that the application program 122 wants to use to process the work associated with a current rendering context. The extensions also allow the application program 122 to create an affinity rendering context that is specifically associated with the affinity device context, meaning that any processing work related to the affinity rendering context is automatically directed by the software driver 136 to only the specified set of GPUs included in the associated affinity device context. Finally, the extensions allow the application program 122 to designate the affinity rendering context as the current rendering context. With this last step, all processing work related to the current affinity rendering context is directed by the software driver 136 to the GPUs included in the affinity mask associated with the current affinity rendering context for processing. One should note that with this approach, to the extent the affinity rendering context includes two or more GPUs, the software driver 136 is responsible for allocating work among those GPUs. The approach, however, allows the application program 122 to choose and limit which GPUs in the overall system perform the processing associated with a particular rendering context.

For example, suppose affinity mask 135, within affinity device context 134, includes GPUs 140 and 160, but not GPU 150, affinity rendering context 130 is specifically associated with affinity device context 134, and affinity rendering context 130 is designated as a first current rendering context. In such a scenario, affinity mask 135 is inherited by affinity rendering context 130 as affinity mask 131, which then includes handles to GPUs 140 and 160. Rendering work associated with affinity rendering context 130 is allocated according to affinity mask 131. In this scenario, GPUs 140 and 160 would process all of the work associated with the first current rendering context, and the software driver 136 would determine the specific work allocation between GPUs 140 and 160. Similarly, if affinity mask 135, within affinity device context 134, includes only GPU 150 and affinity rendering context 132 is specifically associated with affinity device context 134, then affinity mask 133 is inherited from affinity mask 135. In this scenario, if affinity rendering context 132 is designated as a second current rendering context, then the software driver 136 would direct all of the work associated with the second current rendering context to GPU 150 processing.

Figure 2:
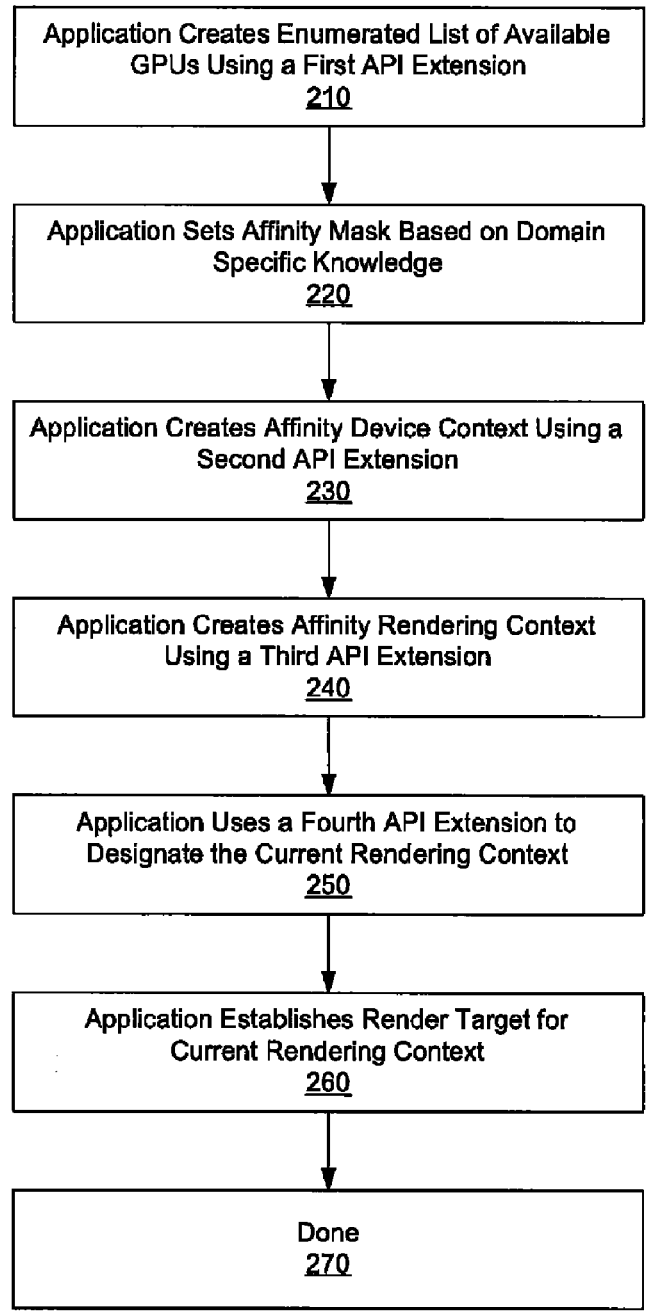
FIG. 2 is a flow diagram of method steps for establishing an affinity rendering context, according to one embodiment of the present invention.

FIG. 2 is a flow diagram of method steps for establishing an affinity rendering context, according to one embodiment of the present invention. Although the method steps are described in conjunction with FIG. 1, persons skilled in the art will understand that any system that performs the method steps, in any order, is within the scope of the invention.

The method of establishing an affinity rendering context begins in step 210, where the application program 122 creates an enumerated list of available GPUs using a first API extension. In WGL, for example, the first API extension, wglEnumGpusNV( ) takes as input an integer index and a pointer to a GPU descriptor handle. By calling wglEnumGpusNV( ) in a loop, and incrementing the integer index for each iteration until wglEnumGpusNV( ) fails, the application program 122 iterates through the number of GPUs in the system, and a first array of GPU descriptor handles is built that corresponds to the available GPUs in the system and forms the enumerated list of available GPUs.

In step 220, the application program 122 sets an affinity mask based on domain specific knowledge that enables the application program to determine which GPUs in the system are best-suited for the particular type of processing the application program 122 needs to have performed. The application program 122 examines the enumerated list of available GPUs and selects which GPUs should process the work associated with a current rendering context. The application program 122 then builds a second array of GPU handles based on the first array of GPU handles, where the GPU handle for each GPU selected to process the work associated with the current rendering context is copied from the first array to a corresponding location in the second array. This second array of GPU handles, which is terminated with a "NULL" value, forms the affinity mask.

In step 230, the application program 122 creates an affinity device context using a second API extension. In WGL, for example, the API extension, wglCreateAffinityDCNV( ), takes the affinity mask generated in step 220 as an input and generates an affinity device context data structure as an output. The API extension also returns a handle to the affinity device context data structure to the application program 122. Importantly, the affinity device context includes an affinity mask that lists each GPU in the multi-GPU system selected by the application program 122 to process work associated with the current rendering context. Thus, referring back to FIG. 1, affinity device context 134 includes an affinity mask 135 that lists which of the GPUs 140, 150 and 160 that the application program 122 wants to process work associated with the current rendering context.

In step 240, the application program 122 creates an affinity rendering context using a third API extension. In WGL, for example, wglCreateContext( ) may be extended to accept the affinity device context generated in step 230 as an input. An affinity rendering context data structure, which includes an inherited copy of the affinity mask within the affinity device context, is then created by wglCreateContext( ). The API extension also returns a handle to the affinity rendering context data structure to the application program 122. Importantly, the affinity rendering context is specifically associated with the affinity device context generated in step 230, meaning that the GPUs included in the affinity device context generated in step 230 are designated to process the work associated with the affinity rendering context generated in this step 240. Referring back to FIG. 1, if in step 230, the affinity device context 134 is input into the third API extension to produce the affinity rendering context 132, then the GPUs included in the affinity mask 135, within the affinity device context 134, are inherited by the affinity mask 133. Affinity mask 133 then designates which GPUs should process the work associated with the affinity rendering context 132.

In step 250, the application program 122 uses a fourth API extension to designate the affinity rendering context generated in step 240 as the current rendering context, thereby instructing the API 126 to direct all work related to the current affinity rendering context to the GPUs included in the affinity mask of the current affinity rendering context. In WGL, for example, wglMakeCurrent( ) may be extended to accept an affinity rendering context handle from step 240 as input, or it might be extended to accept both an affinity device context handle from step 230 and an affinity rendering context handle from step 240 as inputs. These API extensions, in turn, establishes the affinity rendering context generated in step 240 as the current rendering context. Importantly, establishing the affinity rendering context as the current rendering context causes the software driver 136 to direct all processing for the current rendering context to the GPUs included in the affinity device context generated in step 230 that is specifically associated with the affinity rendering context generated in step 240. Referring again to FIG. 1, if the affinity rendering context 132 is designated as the current rendering context, then the software driver 136 directs all processing work associated with the current rendering context to the GPUs included in the affinity mask 133, since this is the affinity mask specifically associated with the affinity rendering context 132 in step 240.

In step 260, the application program 122 establishes a render target, such as a display surface or a render surface, for the current affinity rendering context using a standard API call. In OpenGL, for example, glBindFramebufferEXT( ) may be used to establish the render target for the current affinity rendering context. The method then terminates in step 270.

Figure 3A:
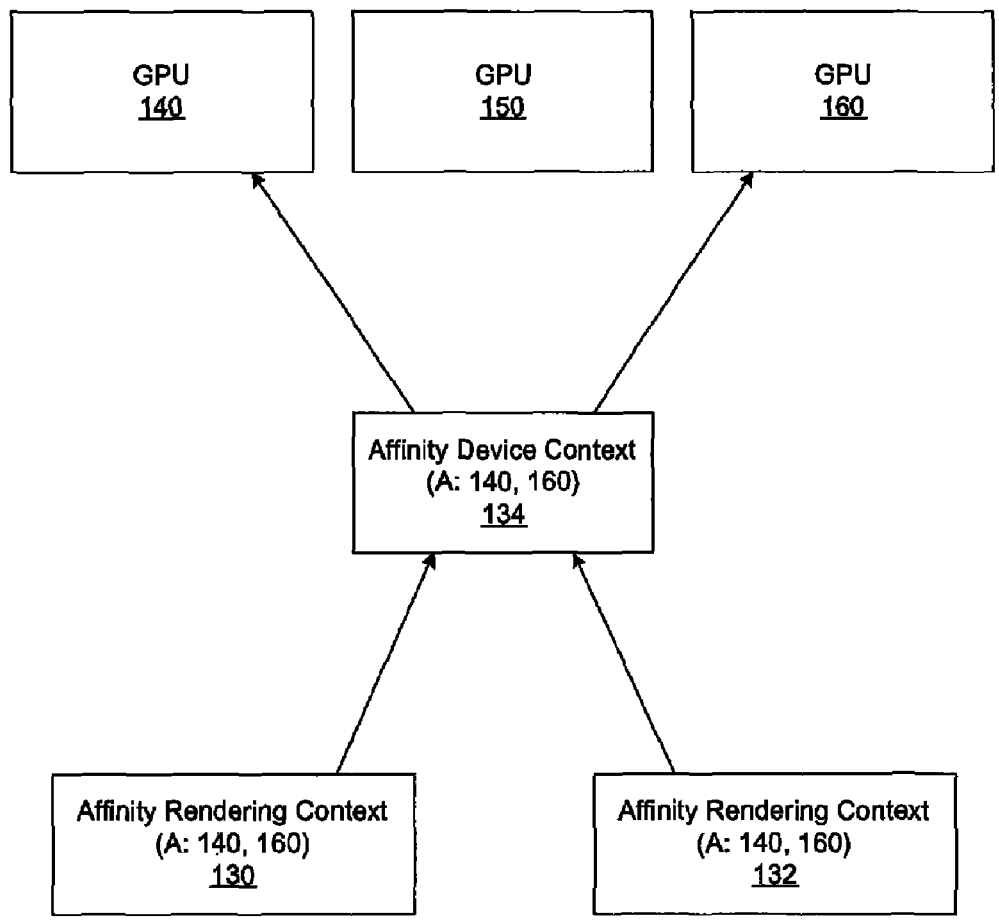
FIG. 3A is a conceptual diagram of affinity relationships based on an affinity mask that associates affinity rendering contexts with one or more GPUs, according to one embodiment of the present invention.

FIG. 3A is a conceptual diagram of affinity relationships based on an affinity mask that associates affinity rendering contexts 130, 132 with one or more GPUs 140, 160, according to one embodiment of the present invention. An affinity mask generated by the application program 122 includes GPUs 140 and 160 (step 220). This affinity mask is used to generate affinity device context 134 (step 230). Affinity rendering context 130 is generated based on affinity device context 134 (step 240). Then, designating the affinity rendering context 130 as the first current rendering context (step 250), causes the software driver 136 to direct all rendering work associated with this first current rendering context to GPUs 140 and 160. Similarly, affinity rendering context 132 is generated based on affinity device context 134 (step 240). Again, designating the affinity rendering context 132 as the second current rendering context, causes the software driver 136 to direct all rendering work associated with this second current rendering context to GPUs 140 and 160.

Figure 3B:
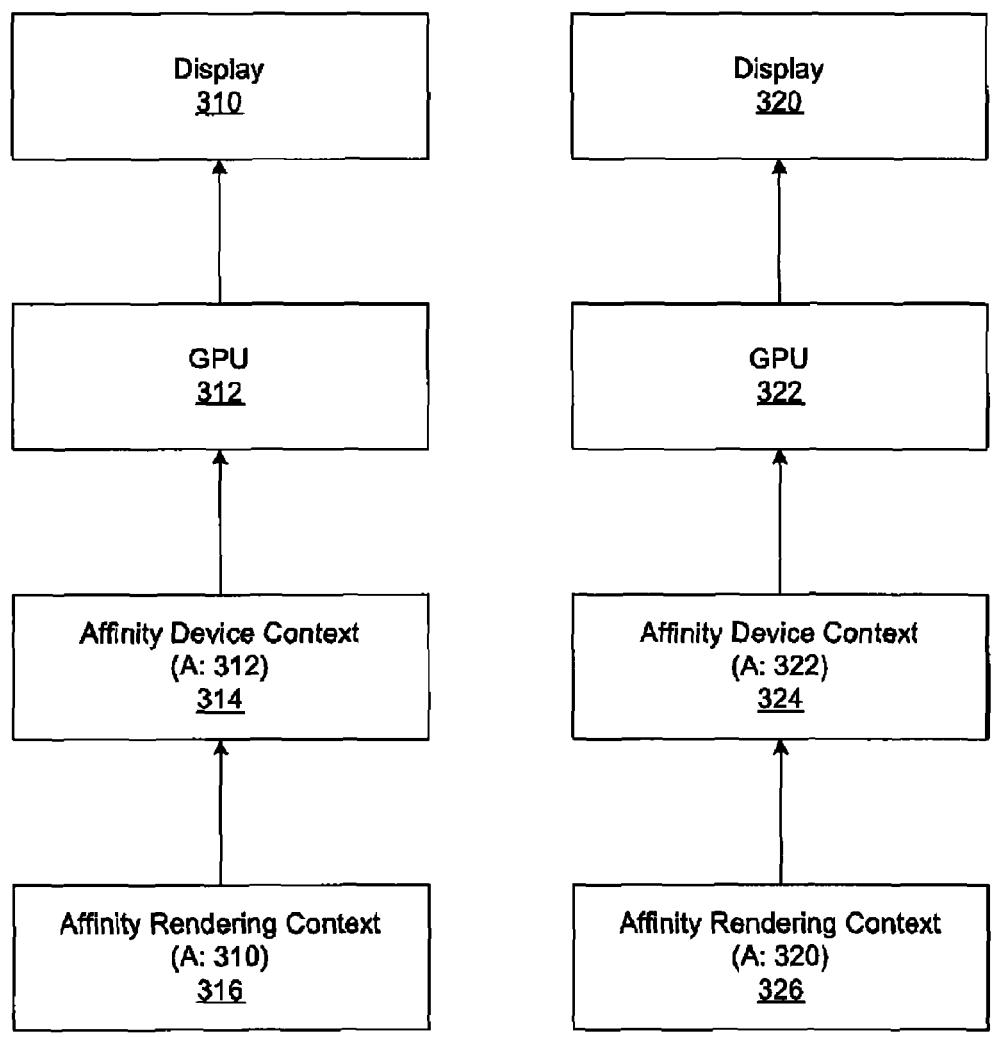
FIG. 3B is a conceptual diagram of affinity relationship in an application including a physics rendering context and a graphics rendering context, according to one embodiment of the present invention.

FIG. 3B is a conceptual diagram of affinity relationship in an application involving a physics rendering context and a graphics rendering context, according to one embodiment of the present invention. For purposes of this discussion, it is assumed that display 310 is a very high-resolution, high-refresh rate display, and GPU 312 has 128 MB of frame buffer memory. It is also assumed that display 320 is a high-resolution, slower 60 Hz refresh rate display, and GPU 322 has 512 MB of frame buffer memory.

Suppose further that an application program is designed to use two different GPUs. One GPU needs to render frames of graphics data and display the resulting frames on an attached display device. The other GPU needs to perform physics calculations in support of the real time dynamics involved in the application. The optimal assignment of work to the GPUs 312, 320 may be based on, for example, the display resolution, display refresh rate, or the amount of attached frame buffer memory associated with each of the GPUs 312, 320. The application may choose optimizations that are not entirely obvious without domain specific knowledge. For example, the application may preferentially assign the graphics rendering task to the GPU with the most frame buffer memory, GPU 322, so long as the display 320 has adequate resolution and a refresh rate of 60 Hz or better. In such a scenario, the application program would choose to assign physics computations to GPU 312 and graphics rendering to GPU 322, although a well-meaning software driver may otherwise assign the graphics rendering and display responsibilities to GPU 312 because this GPU is attached to the better display 310.

To specifically select GPU 322 for graphics rendering and display, the application program would define an affinity mask that includes only GPU 322. The application program would generate an affinity device context 324 using the affinity mask for GPU 322. The application program would then generate an affinity rendering context 326 and designate it as the graphics rendering context. Similarly, to specifically select GPU 312 for physics rendering, the application program would use an affinity mask that includes only GPU 312 to generate affinity device context 314 and affinity rendering context 316 and then designate the affinity rendering context 316 as the physics rendering context. Designating the affinity rendering context 326 as the graphics rendering context and the affinity rendering context 316 as the physics rendering context, would cause the software driver to direct all graphics rendering commands solely to GPU 322 via affinity rendering context 326 and to direct all physics rendering commands solely to GPU 312 via affinity rendering context 316. Communication between the two GPUs 312, 322 would be accomplished using any technically feasible technique.

In sum, a set of API extensions are added to an existing API, such as WGL, that enable a software application to specify which GPUs should be involved in rendering a given set of graphics commands. The software application uses one API extension to generate an affinity device context that includes only those GPUs specifically selected by the software application to process the set of graphics commands. The software application uses a second API extension to generate the affinity rendering context based on the affinity device context. Then the software application uses yet another API extension to designate this affinity rendering context as the current rendering context used by the application to issue rendering commands. This technique allows the software application to utilize domain specific knowledge to select which GPUs in a multi-GPU system are assigned specific rendering work. In this way, graphics processing work may be allocated to the GPUs more efficiently relative to the work allocations that software drivers can achieve in prior art multi-GPU systems. Another advantage is that existing API models, such as OpenGL and D3D, may be preserved since they operate orthogonally to the GPU selection process described herein, making the disclosed techniques cost effective. In other words, the API extensions described herein do not alter the use of legacy API calls found in conventional API libraries.

One embodiment of the present invention is implemented as a computer-readable medium that includes a set of instructions. When the set of instructions executed by a processor causes a computing device to allocate processing work among a plurality of graphics processing units available for processing, by performing the steps of: receiving an affinity mask reflecting which graphics processing units in the plurality of graphics processing units have been selected to process work associated with a current rendering context; generating an affinity device context based on the affinity mask and including each graphics processing unit that has been selected to process work associated with the current rendering context; and generating an affinity rendering context from the affinity device context, wherein the affinity rendering context inherits the affinity mask from the affinity device context.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

We claim:

1. A method for controlling the allocation of processing work in a system having a plurality of graphics processing units available for processing, the method comprising:
   receiving an affinity mask that enables an application to determine which graphics processing units in the plurality of graphics processing units are most appropriate for processing work associated with a first current rendering context;
   generating an affinity device context that includes the affinity mask, wherein the affinity mask is located within the affinity device context; and
   generating an affinity rendering context associated with the affinity device context, wherein the affinity rendering context inherits the affinity mask from the affinity device context.

2. The method of claim 1, further comprising the step of setting the affinity rendering context as a second current rendering context.

3. The method of claim 2, further comprising the step of directing processing work associated with the second current rendering context to each graphics processing unit included in the affinity device context.

4. The method of claim 1, further comprising the step of establishing a render target for the current rendering context.

5. The method of claim 1, further comprising the step of generating the affinity mask by generating a first array of handles, wherein each handle corresponds to a different one of the graphics processing units in the plurality of graphics processing units.

6. The method of claim 5, wherein the step of generating the affinity mask also includes the steps of generating a second array of handles, and, for each graphics processing unit selected to process work associated with the first current rendering context, copying the handle corresponding to the graphics processing unit from the first array of handles to the second array of handles.

7. The method of claim 1, further comprising the steps of:
   receiving a second affinity mask that enables an application to determine which graphics processing units in the plurality of graphics processing units are most appropriate for processing additional work;
   generating a second affinity device context that includes the second affinity mask, wherein the second affinity mask is located within the second affinity device context; and
   generating a second affinity rendering context associated with the second affinity device context, wherein the second affinity rendering context inherits the second affinity mask from the second affinity device context.

8. The method of claim 7, further comprising the steps of establishing the second affinity rendering context as a third current rendering context and directing processing work associated with the third current rendering context to each graphics processing unit included in the second affinity device context.

9. The method of claim 1, wherein the affinity mask also reflects which graphics processing units in the plurality of graphics processing units have been selected to process additional work, and further comprising the steps of generating a second affinity rendering context associated with the affinity device context, designating the affinity rendering context as a first current rendering context, and designating the second affinity rendering context as a second current rendering context.

10. The method of claim 1, wherein the affinity mask is generated by the application by the steps comprising:
   calling a first API extension one or more times to generate a first array of handles corresponding to each of the plurality of graphics processing units available in the system;
   generating a second array of handles corresponding to the graphics processing units selected to process work, wherein the graphics processing units for processing work are selected based on domain specific knowledge about the system; and
   setting the affinity mask as the second array of handles.

11. The method of claim 10, wherein the affinity device context is generated by the application by the steps comprising calling a second API extension, with the affinity mask provided as input, to generate an affinity device context data structure in a system memory.

12. The method of claim 11, wherein the first API extension and the second API extension are extensions of the OpenGL API.

13. A computing device configured to allocate processing work among a plurality of graphics processing units available for processing, the computing device comprising:
   a central processing unit;
   a system memory; and
   an application programming interface residing within the system memory and configured to:
   receive an affinity mask that enables an application program to determine which graphics processing units in the plurality of graphics processing units are most appropriate for processing work associated with a first current rendering context,
   generate an affinity device context that includes the affinity mask, wherein the affinity mask is located within the affinity device context, and
   generate an affinity rendering context associated with the affinity device context, wherein the affinity rendering context inherits the affinity mask from the affinity device context.

14. The computing device of claim 13, wherein the application program sets the affinity rendering context as a second current rendering context.

15. The computing device of claim 14, further including a software driver residing in the system memory and configured to direct processing work associated with the second current rendering context to each graphics processing unit included in the affinity mask inherited by the affinity rendering context.

16. The computing device of claim 14, wherein the application programming interface is further configured to establish a render target for the second current rendering context.

17. The computing device of claim 13, wherein the application program resides in the system memory and is configured to generate the affinity mask by generating a first array of handles, wherein each handle corresponds to a different one of the graphics processing units in the plurality of graphics processing units.

18. The computing device of claim 17, wherein the application program, to generate the affinity mask, is further configured to generate a second array of handles, and, for each graphics processing unit selected to process work associated with the first current rendering context, copying the handle corresponding to the graphics processing unit from the first array of handles to the second array of handles.

19. A computer-readable storage medium, excluding transitory signal-bearing media, that includes a set of instructions that when executed by a processor causes a computing device to allocate processing work among a plurality of graphics processing units available for processing, by performing the steps of:

receiving an affinity mask that enables an application to determine which graphics processing units in the plurality of graphics processing units are most appropriate for processing work associated with a first current rendering context;

generating an affinity device context that includes the affinity mask, wherein the affinity mask is located within the affinity device context; and generating an affinity rendering context associated with the affinity device context, wherein the affinity rendering context inherits the affinity mask from the affinity device context.

20. The computer-readable medium of claim 19, wherein the application sets the affinity rendering context as a second current rendering context.

21. The computer-readable medium of claim 20, further comprising the step of establishing a render target for the second current rendering context.

22. The computer-readable medium of claim 20, further comprising the step of directing processing work associated with the second current rendering context to each graphics processing unit included in the affinity device context.

* * * * *